(12) United States Patent
Zukowski et al.

(10) Patent No.: US 7,467,355 B1
(45) Date of Patent: Dec. 16, 2008

(54) METHOD AND SYSTEM FOR ORGANIZING PROJECTS IN AN INTEGRAL USER ENVIRONMENT

(75) Inventors: Joseph Jacob Zukowski, Seattle, WA (US); Brian Thomas Albrecht, Kirkland, WA (US); Douglas C. Kramer, Bothell, WA (US); Warren G. Stevens, Issaquah, WA (US); Benjamin Nicholas Truelove, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 10/607,707

(22) Filed: Jun. 27, 2003

(51) Int. Cl.
    *G06F 3/00* (2006.01)
(52) U.S. Cl. .................... 715/765; 715/963; 715/804
(58) Field of Classification Search .................. 715/765, 715/739, 804, 775, 776, 963
    See application file for complete search history.

(56) References Cited

U.S. PATENT DOCUMENTS

| | | | | |
|---|---|---|---|---|
| 5,457,476 A | * | 10/1995 | Jenson | ........................ 715/823 |
| 6,078,326 A | * | 6/2000 | Kilmer et al. | ............... 715/834 |
| 6,809,724 B1 | * | 10/2004 | Shiraishi et al. | ............. 345/169 |
| 7,107,268 B1 | * | 9/2006 | Zawadzki et al. | ............... 707/9 |
| 2002/0060698 A1 | * | 5/2002 | Laurikka et al. | ............. 345/765 |
| 2002/0154178 A1 | * | 10/2002 | Barnett et al. | ................ 345/853 |
| 2004/0010513 A1 | * | 1/2004 | Scherr et al. | ............. 707/104.1 |
| 2004/0225695 A1 | * | 11/2004 | Womack | ..................... 707/202 |

* cited by examiner

*Primary Examiner*—Dennis Bonshock
(74) *Attorney, Agent, or Firm*—Shook, Hardy & Bacon, L.L.P.

(57) ABSTRACT

An integrated user environment for creating, managing, and organizing components of a project. A user is able to select a predefined project that includes a list of to do items, or can start with a blank project and add to do items. Once a to do item has been added, the user can associate several different functions with the to do item, including a due date, a note, and one of several categories of entities. These entities include a task or template, a document, and a Web link. If the user selects a task or template, Answer Wizard technology returns options that may be relevant to the selected to do item. Since all of the components of the project are accessible by the user from within an integral project environment, it is relatively efficient for the user to manage the project and make any changes that are required.

24 Claims, 9 Drawing Sheets

METHOD AND SYSTEM FOR ORGANIZING PROJECTS IN AN INTEGRAL USER ENVIRONMENT

FIELD OF THE INVENTION

This invention generally pertains to an integral environment for creating, collecting, and maintaining information relating to projects, and more specifically, pertains to an integral user environment for projects in which templates or tasks, documents, or Web links can be selected and associated with "to do" items comprising a project.

BACKGROUND OF THE INVENTION

When working on a project, a person will typically produce several documents and access one or more Web sites that relate to the project. For example, if the project involves planning a party, a person might create a guest list, prepare a menu or look up recipes for food and drink to be served, create a list of games to be played, and refer to a Web site that enables the person to print a map showing the location where the party will be held. Conventionally, a person might manually group the documents related to a project in a directory so that they are all readily accessible when the person wants to work on the project or make additions, deletions, and manage a "to do list" of actions or activities that must be done as part of the project. Since some of the to do activities, such as ordering a cake from a bakery, may have to be done by a certain date in advance of the party, the person will want to enter a reminder of the due date for the action in a scheduling program. Typically, the due date can only be scheduled from within a calendaring program, which involves yet another separate step. If a change is made in the date scheduled, the calendaring program must again be accessed.

Many computer users find it difficult to carry out tasks such as creating a directory, and storing or moving documents and Web links into a directory, either because they are neophytes or because they lack the time to be bothered with the details of such operations. Inexperienced users might well be intimidated by the prospect of managing a project on a computer and manually placing all of the documents and other files or links to Web sites related to a project within a directory for efficient reference when working on the project, while more experienced users simply may not have the time to do so. Accordingly, it is apparent that providing a program that integrates all related to do items, and all related tasks or templates, documents, and Web links within an integrally accessed user interface would greatly facilitate the creation and implementation of a project, particularly by those who are either not very knowledgeable about computers and software or are too busy. The integrated user environment should also enable a user to readily enter or change a due date by which a to do item in a project must be complete, without the need to manually access a calendaring or scheduling module. In addition, as items in the to do list are completed, the integral environment should provide an indication to the user of the completed status of each such item. But even more importantly, the integral environment for handling projects should enable a user to associate a task or template, a document, or a Web link with a to do item in a project, so that the entity associated with the to do item is also readily accessible from within the integral environment of the project. In this way, a to do item listed as "create map showing location of party" in the example noted above, might readily be associated with a Web site that enables a user to enter a street address and display and print a map showing the location of the address. Similarly, a to do item for "create invitations" might be associated with a document or template selected for facilitating creating an invitation.

Any task or template, document, or Web link should be accessible from within the integral project environment, and should open another software program as appropriate to enable a person to view, modify, or carry out other pertinent functions. The prior art has not provided such flexibility and simplicity for handling to do items and associated tasks, templates, or Web links.

SUMMARY OF THE INVENTION

One aspect of the present invention is directed to a method for enabling a user to organize a project within an integral user environment, so that all of the components of the project are readily accessible. The integral environment for the project is opened by executing a project software program or module. From this integral user environment or project environment, the user can access all of the information pertinent to the project. More specifically, the user can create a list of to do items that are displayed within the integral user environment. One of the more powerful functions of the present invention is that it enables a user to associate an entity such as a task or template, a document, or a Web link with a selected item in the list of to do items. Once the entity has thus been associated with the item, the user can readily access the entity from within the integral user environment.

To facilitate this capability, the present invention provides for displaying a plurality of categories of entities from which the user can select in the integral user environment. The user can then select one of the categories, which causes the present invention to display several different entities that relate to the currently selected item in the to do list. In response to one of the options being selected by the user, an indication is then provided that the selected option is associated with the to do item in the list. The categories of such entities include a Web link, a task (also sometimes alternatively referred to herein as a template), and a document. The method automatically executes a natural language search for relevant entities to display to the user, based on the to do item in the list that is currently selected. The search can return prospective options to display to the user that are derived from other programs accessible to the user (e.g., installed on the user's computer). A "blank" template, such as a spreadsheet or database, will typically also be included among the options that are displayed to the user.

The user can also enter text comprising a note that becomes associated with the currently selected to do item in the list. This note is displayed within the integral user environment when the user subsequently again selects that to do item in the list.

From within the integral user environment, the user can also indicate a due date that is associated with the currently selected to do item in the list. The date indicated by the user is automatically scheduled within a calendar program (without requiring the user to open the calendar program) so that the user is subsequently provided a reminder by the calendar program on the date thus indicated.

Preferably, the method includes the step of providing a plurality of defined projects from which the user can choose. Each defined project includes a plurality of proposed to do items that are likely to be relevant to the subject matter of the defined project.

A further aspect of the present invention is directed to a memory medium on which are stored machine instructions for carrying out the steps of the method discussed above.

Similarly, another aspect of the present invention is directed to a system that includes a user input device and a display that are coupled to a processor. The processor executes machine instructions stored in a memory coupled to the processor to carry out functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a functional block diagram of an exemplary personal computer (PC) that is suitable for implementing the present invention;

FIGS. 2-4 together comprise a flow chart showing the logical steps implemented in a preferred embodiment of the present invention;

DESCRIPTION OF THE PREFERRED EMBODIMENT

Exemplary System for Implementing Present Invention

Figure 1:
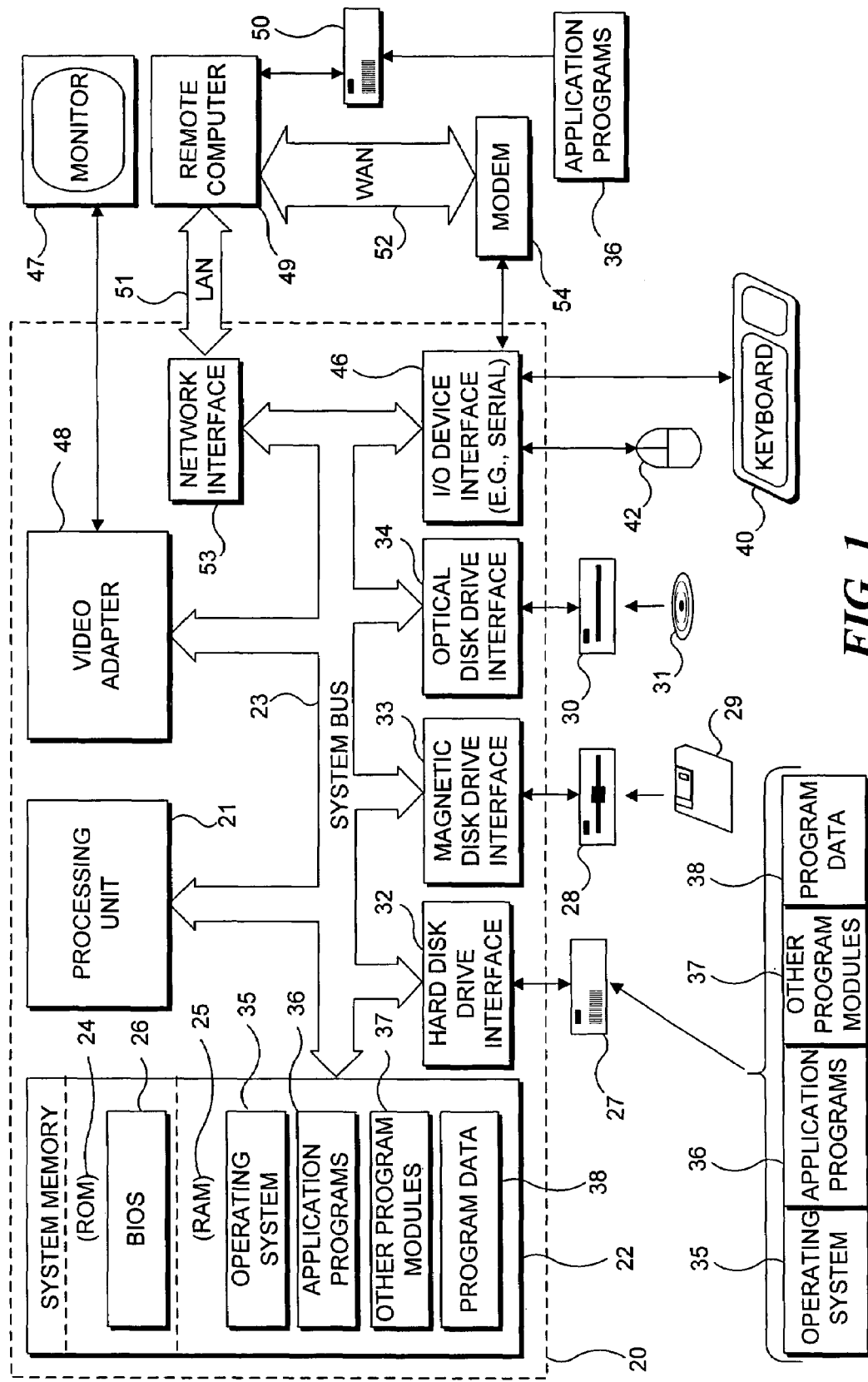

With reference to FIG. 1, an exemplary system is illustrated that is suitable for implementing the present invention. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36 such as that employed to execute the present invention, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

PC 20 can operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Logical Steps Employed in a Preferred Embodiment of the Present Invention

An initial preferred embodiment of the present invention is employed within Microsoft Corporation's WORKS™ productivity suite. Generally, this software product is used by individuals who are interested in a product sold at a lower price point than Microsoft Corporation's OFFICE XP™ productivity suite or by user who are less sophisticated and knowledgeable about computers than those who might use the more complex programs. One of the intentions of including a project organizer in accord with the present invention within the WORKS™ productivity suite is that it enables an inexperienced user of a computer to create, edit, and organize all aspects of a project within an integral project environment, since all of the components of a project are readily accessible from within an integrated user interface comprising the My Project module. The My Project module is accessible through Microsoft Corporation's WORKS™ productivity suite as a selection in a task launcher. When this selection is chosen, a number of predefined projects are displayed to the user within the integral project environment. The user can create a new project simply by selecting one of these predefined projects, as explained in greater detail below. The predefined projects are intended to be useful and to provide examples that demonstrate the options available to a user. After working with a predefined project, a user can readily create a new project and enter a set of to do items that meets the needs of the user (and/or modify one of the predefined projects as desired). Accordingly, one of the options that can be selected on the initial display instead of a predefined project is a "blank project."

A major advantage of providing an integral environment for handling each project of a user is that it simplifies the task of creating, editing, and managing the components of a project, by making them all accessible from within the integral project environment. Another important aspect of the present invention is that it enables a user to associate tasks or templates, as well as documents, or Web links with to do items. The association between a to do item in the list and an associated entity is clearly indicated, so that the task or template, document, or Web link can readily be accessed from within the project environment simply by clicking on the indicated association with a pointing device.

In addition, the user can enter a note or comment that is then associated with a selected item in the to do list, so that the note is displayed each time that the item is again selected. Further, a date can be associated with any item in the to do list and once entered by the user, is automatically scheduled within a calendar module that is part of the WORKS™ productivity suite. Examples of each of these features are illustrated in FIGS. 5-9 and discussed in greater detail below.

Figure 2:
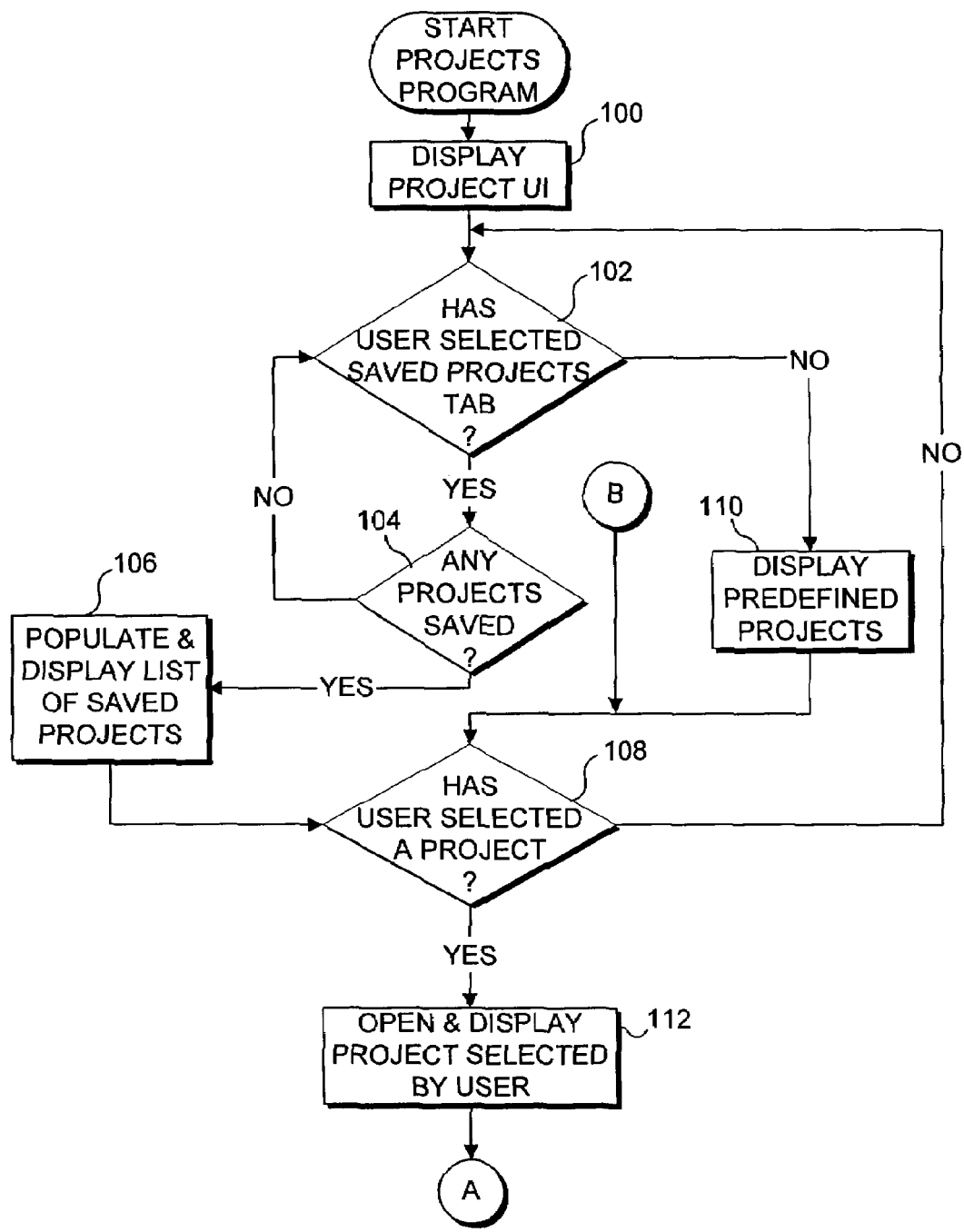
Figure 3:
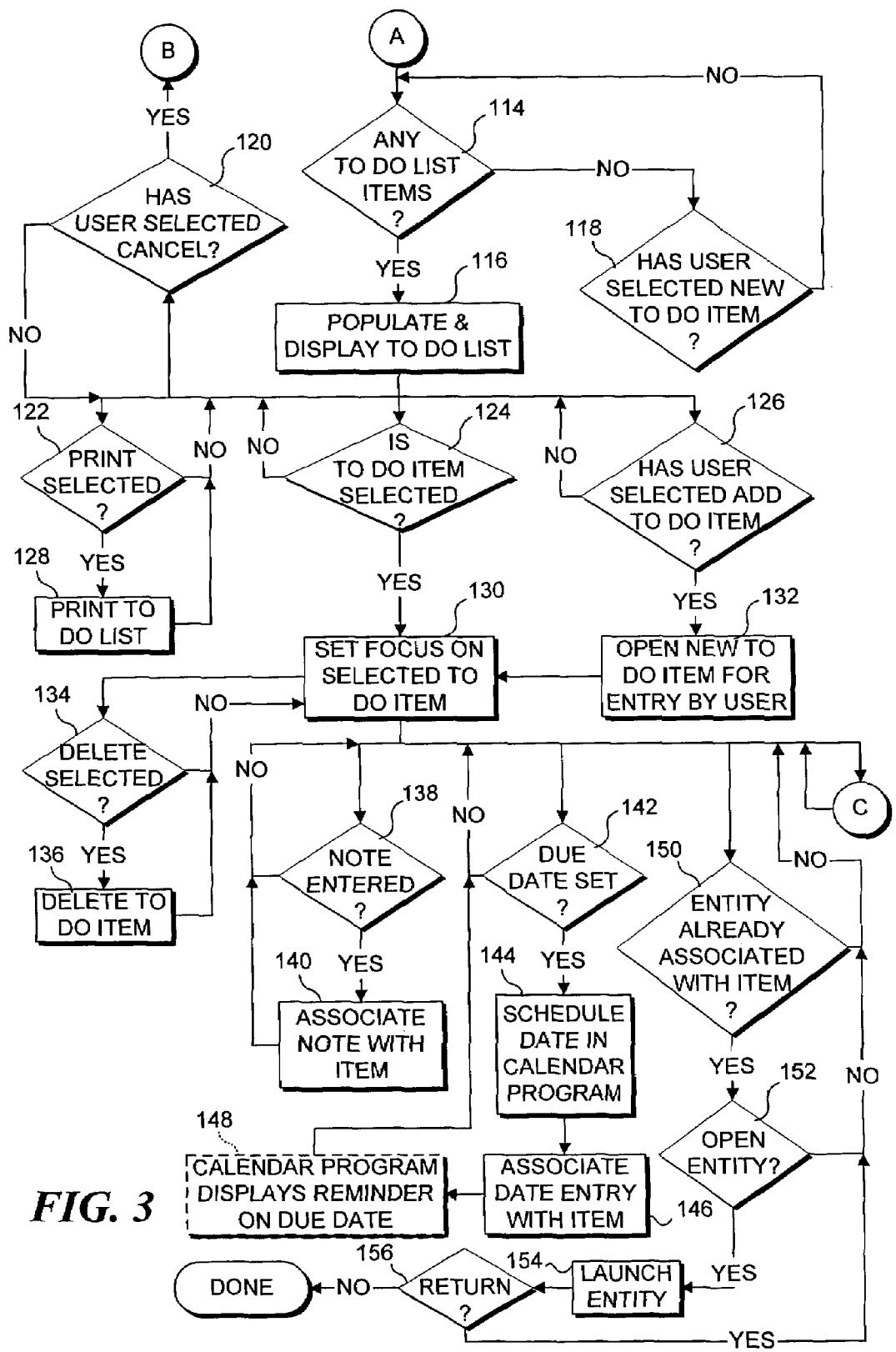
Figure 4:
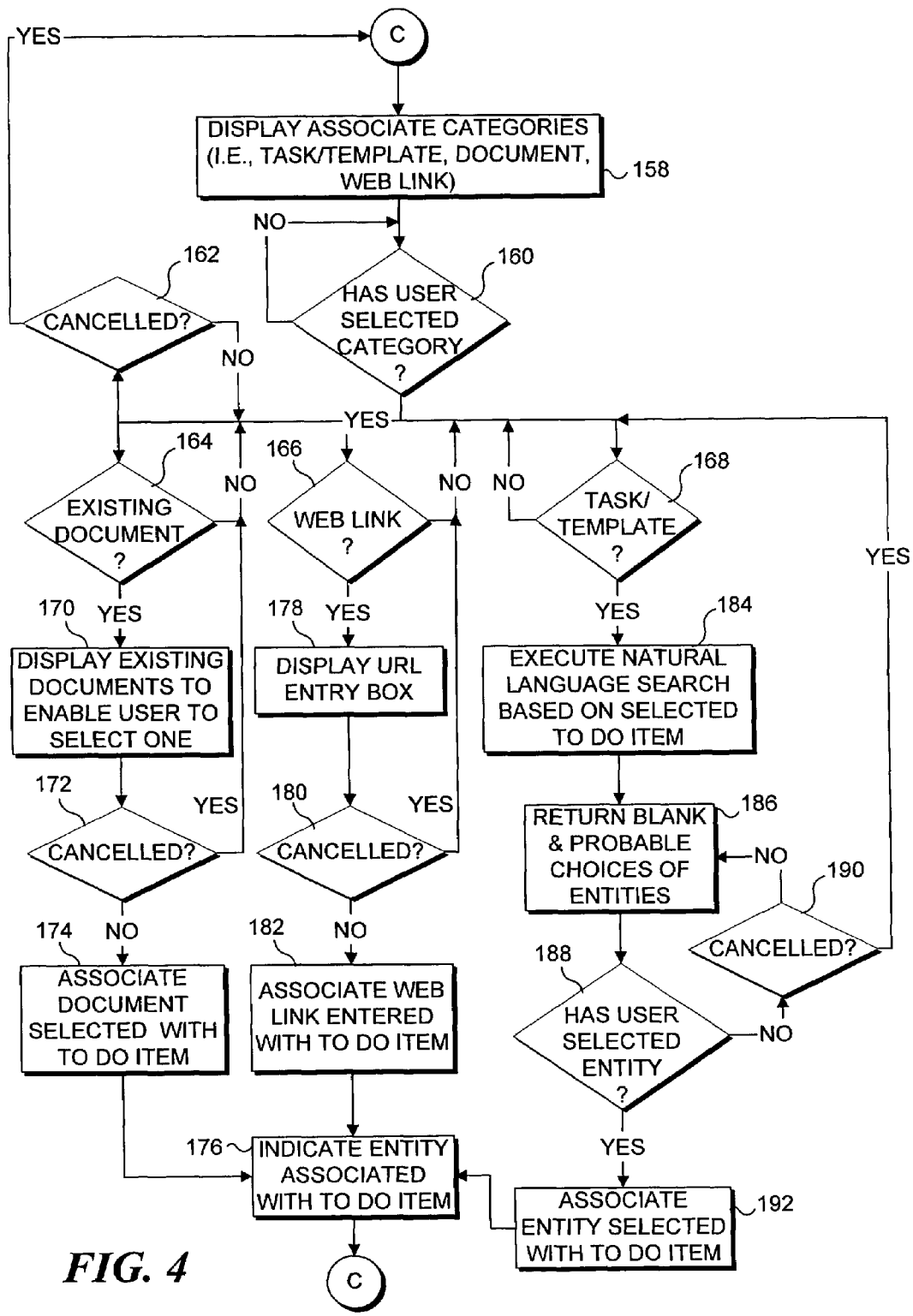

FIGS. 2-4 illustrate the logical steps involved in implementing the present invention and in enabling the user to organize and manage a project within an integral project environment in accord with a preferred embodiment of the present invention. As shown in FIG. 2, the logic is initiated when the user starts the Projects program. Next, a step 100 provides for providing an initial Project user interface display, for example, on monitor 47 (shown in FIG. 1). Examples illustrating various aspects of the Projects user interface are discussed below, in connection with FIGS. 5-9. A decision step 102 then determines if the user has selected an option to view saved projects. If so, a decision step 104 determines if any projects have previously been saved by the user. Generally, once a user either selects a blank project and starts entering to do items, or alternatively selects a predefined project and adds a to do item, or makes any changes in connection with the proposed predefined list of to do items, the project will automatically be saved when the user closes out of that project. Thereafter, until deleted, the project that was changed by the user will appear on the saved projects window, which is opened by selecting on option in the user interface, as further discussed below. Thus, a positive response to decision step 104 leads to a step 106, wherein the program populates and displays a list of the previously saved projects of the user. However, if no projects have been previously displayed, the logic loops back from decision step 104 to decision step 102.

Following step 106, a decision step 108 determines if a user has selected a project. The user can select a project simply by moving a cursor so that it is over one of the projects in the saved projects display and then clicking on the select button, using a mouse or other type of pointing device. The first project in the list is automatically selected to be opened when the user initially chooses the saved projects option. Decision step 108 is also reached if a user did not select the saved projects option in decision step 102. If so, the user is then provided with a display of the predefined projects as indicated in a step 110. Accordingly, if a user chooses one of the predefined projects, an affirmative response is returned from decision step 108. If not, the logic simply returns to decision step 102, to wait until a user selects an option.

Once a user has selected a project, either from the list of previously saved projects or from one of the predefined projects that are included with the Projects program, a step 112 opens and displays the project that was selected by the user. As an alternative to the predefined projects, a user may optionally choose a blank project option, which will enable the user to create a custom project.

The logic then continues as shown in FIG. 3 with a decision step 114. In this decision step, the logic determines if there are any to do items listed within the project that is displayed. Clearly, if a user has selected the blank project option, there will not be any to do items listed. However, if the user has selected either a predefined project or one that was previously saved, an affirmative response to decision step 114 will lead to a step 116, wherein the program populates and displays the to do list. Such a list will include one or more to do items. Each of these items represents either a prospective item that might well be relevant to the project, if a predefined project had just been selected, or may be a list of the to do items that the user has entered previously in a project created from scratch by the user, using the blank project option. Even in a predefined list of to do items that was previously saved, the user may have added to do items or deleted to do items from the list initially provided. If there are no to do items included in the list that is displayed, the user is likely working within a blank new project. Accordingly, a decision step 118 determines if the user has selected a new to do item to be added to the list. If not, the logic waits for the user to do so, since entry of a to do item is typically the first thing that is done when initially starting with a blank project.

After the to do list of items has been populated in step 116, a number of alternatives are available to the user. For example, the user may have just opened a predefined project and decided that it is not appropriate for what the user had in mind. Or, the user may conclude that there is insufficient time to work on the project, or may decide not to work on the project at the present time. In this case, the user would typically select cancel, to close out of the current project, as indicated in decision step 120, which determines if the user has selected the cancel option. If so, the logic returns to FIG. 2 and continues with decision step 108 since the user may decide to select a different project than previously selected, either from the predefined projects, or from one of the projects previously saved by the user. However, if the user has not selected cancel, the user may instead choose one of the other options available at this point in the logic. For example, the user may select the print option, as indicated in decision step 122. If so, a step 128 prints the to do list and returns the user to the state immediately following step 116. Or, the user may select one of the to do items that is displayed, as indicated in a decision step 124. As a further alternative, the user may select an "add to do item" option in a decision step 126.

If the user has selected one of the to do items from the list at decision step 124, a step 130 sets the focus on the selected to do item in the list. Alternatively, if the user has chosen to add a to do item in decision step 126, a step 132 opens the new to do item for entry of a text descriptive phrase by the user. At this point, the user would enter a descriptive name or phrase for the to do item that describes or identifies it. Thereafter, the logic continues with step 130, with the new to do item having the focus.

A decision step 134 determines if "delete" has been selected, since the user may have selected a to do item in the list for deletion. If so, a step 136 deletes the to do item that was selected and the logic then returns to step 130. Similarly, the logic remains at step 130 if delete has not been selected.

The user may enter a note or text comment in regard to the selected item that has the focus in step 130, as indicated in a decision step 138. Any note that has been entered by the user is associated with the to do item that was selected, in a step 140. The logic thereafter returns to a point after step 130. While not indicated in this flow chart, it will be apparent that the user may select a different to do item in the list, which would then again lead to step 130, with the new to do item that was selected having the focus.

As a further alternative, once a to do item has been selected and has the focus, the user may choose to set a due date for the item, as indicated in a decision step 142. If this option is chosen, a step 144 provides for scheduling the date entered by a user within a calendar module associated with the WORKS™ productivity suite. This scheduling occurs automatically and "behind the scene," so that the user is not required to separately and manually access the calendar program. Instead the due date entered by the user is automatically scheduled within the calendar module, in association with the selected to do item and will show there if that date in the calendar module is subsequently manually accessed by the user. Moreover, the to do item will now show a due date associated with it, corresponding to the date that was entered by the user, as provided in a step 146. The calendar module will now display a reminder to the user on or before the due date, indicating that some action related to the to do item is due to be done by that date, as indicated in a step 148. Following step 148, or if a due date was not set, the logic returns to a point wherein the focus is on the currently selected to do item.

Other entities can be associated with any of the to do items in a list of a project. Accordingly, a decision step 150 determines if an entity is already associated with an item that has the focus. In this embodiment, the entity can be one of a task or template, a document, or a Web link, but other types of entities might be used instead. Examples showing how these different types of entities can be used within the present invention are provided in the Figures discussed below. If an entity is already associated with a to do item in the list, a decision step 152 determines if the user has selectively chosen to open the entity (from within the integral project environment). If so, a step 154 launches the entity, which may require opening another program module in WORKS, or within some other software application with which the entity is created, edited, or otherwise appropriately processed. Within this application that is opened, the user can then carry out any further work required for the entity, such as creating or editing the entity in regard to the currently selected to do list item. For example, if the user has selected a to do list item corresponding to "create a menu for a party," the entity associated with the to do list item may be a document that the user has previously created that lists the food and drink to be served at a party, or the user may have associated a Web link to a party menu Web site with the to do item. Or, the user may want to change the menu included in a WORD document that was previously created, which would require launching a word processing program that was used to create the document.

Once the user has completed any work to be done within the program used to process the entity, a decision step 156 determines if the user has selectively chosen to return to the project in which the user was previously working, and if not, the logical steps are concluded. However, if the user wishes to return, or if the user has decided not to open the entity associated with the to do item selected, or if an entity is not already associated with the item, the logic continues at the level under step 130.

FIG. 4 illustrates further steps associated with the options available under step 130. In a step 158, the Projects program displays the categories of entities that can selectively be associated with a to do item. As noted above, these categories include a template (or task) that may be relevant to the selected to do item, as well as a document, or a Web link. A decision step 160 determines if the user has selected one of these categories, and if not, the logic waits until the user does (or takes some other action in regard to a different portion of the user interface, as noted above). However, if a user has selected a category for an entity to be associated with the to do item, the category selected is determined in decision steps 164, 166, or 168. Once a category has been selected, the user may also cancel the selection as indicated in a decision step 162. If canceled, the logic returns to the point under step 130 in FIG. 3, as discussed above. If not canceled, the logic waits for the user to continue with the selection, or to choose a different category.

In decision step 164, the logic determines if the user has selected the existing document category. If so, a step 170 displays a browser window to enable the user to select a document that may be pertinent to the currently selected to do item. However, the user may decide not to work with an existing document, and as indicted in a decision step 172 may choose to cancel this choice, returning again to the point under decision step 160. However, if the user has not canceled the choice, step 174 provides for associating a document chosen in the browser window with the current selected to do item. Next, a step 176 indicates that the document selected is associated with the current to do item. The logic then returns to the point (in FIG. 3) below step 130.

If the user has chosen the Web link category, decision step 166 continues with a step 178, which displays a uniform resource locator (URL) entry box that enables the user to enter the address for a Web site or Web page that is to be associated with the currently selected to do item. Again, a decision step 180 determines if the user has decided not to associate a Web link with the currently selected to do item, and if so, returns to the point under decision step 160 wherein the user selects a class of entity. If not cancelled, a step 182 associates the Web link that was entered by the user with a current selected to do item, leading to step 176, which indicates the entity is thus associated with a to do item.

Finally, if the user has selected the task or template option, decision step 168 continues with a step 184, which uses Answer Wizard technology to execute a natural language search or query of tasks or templates provided in the WORKS™ productivity suite and in other applications that are registered in the operating system, based on the to do item that is currently selected, to determine if any template or task can be identified as relevant to that currently selected to do item. The program returns the probable choices of such entities for consideration by the user. Such choices will often include one or more blank options, such as a blank spreadsheet. The user can then select any of the returned choices that may be relevant or choose a blank task for association with the currently selected to do item. A decision step 188 determines if the user has selected an entity from the options that are returned, and if so, a step 192 associates the entity selected with the to do item, leading to step 176 which indicates the entity which is associated with the to do item. If the user does not select an entity in decision step 188, the logic determines if the user has cancelled this operation in a decision step 190, and if not, returns and waits for the user to select one of the choices returned by the natural language search. If the user has selected cancel, the logic returns to the point under step 160 where the user may choose to select a different entity category. Of course, at any time, the user may select a different to do item which will alter the options shown in FIG. 4 so that they correspond with the new selected to do item in the list.

Figure 5:
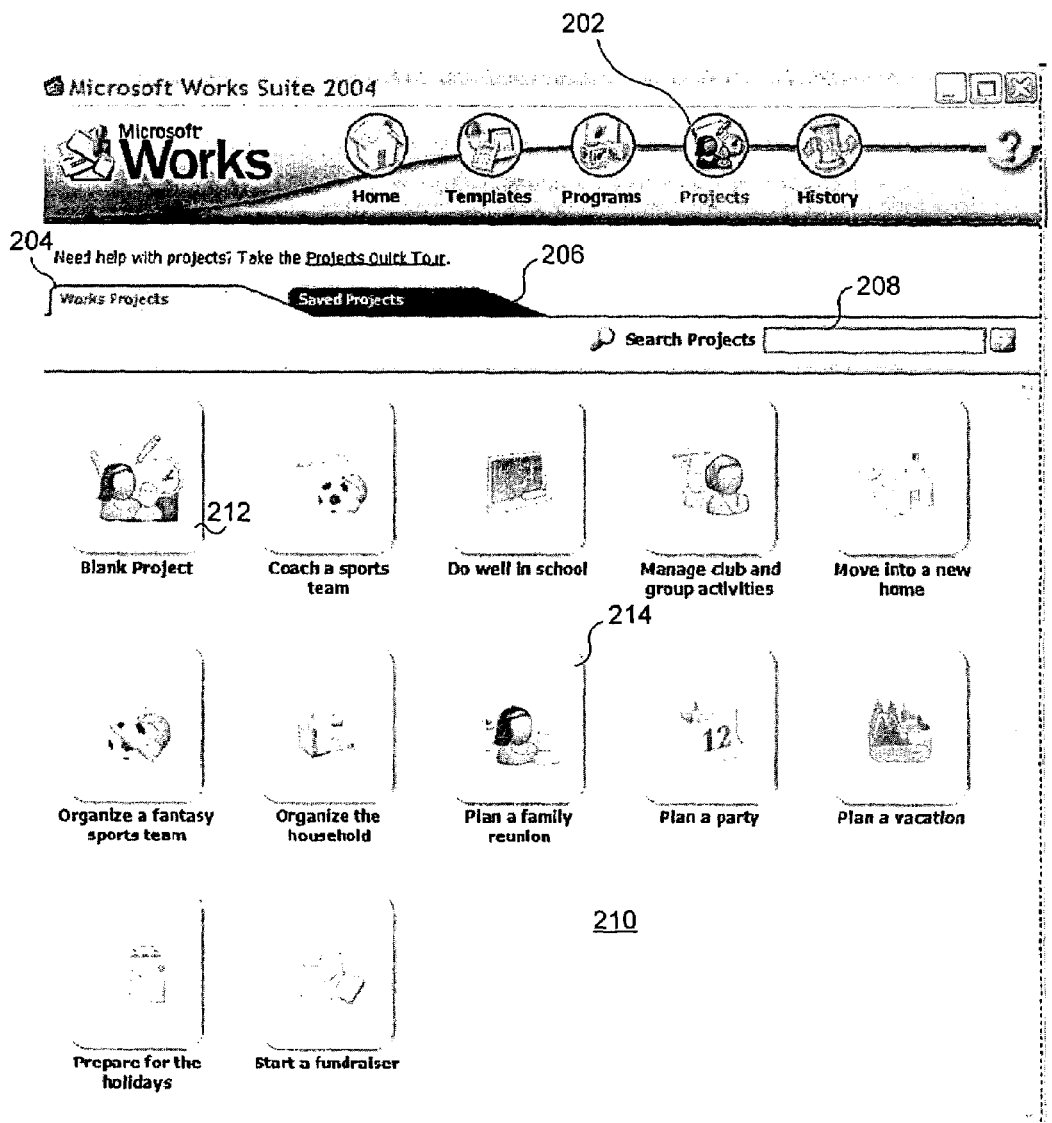
FIG. 5 is an exemplary view of an integral environment for organizing a project in accord with the present invention, showing a plurality of predefined projects that are included with the software program that implements the invention.

FIG. 5 illustrates an exemplary initial user interface 200 for the present invention, which shows the display presented to a user when the user selects a Projects option 202 in the task launcher for Microsoft Corporation's WORKS™ productivity suite. Initially, a tab 204 for WORKS™ Projects is selected by default for the user interface displayed, when the user chooses to run the Projects module. As shown in this Figure, WORKS™ Projects tab 204 displays a window 210 in which a plurality of predefined projects 214 are included, as well as a blank project option 212. While other programming languages may alternatively be used, this preferred embodiment employs extended markup language (XML) to define the user interface for the Projects module.

The user may optionally choose a Saved Projects tab 206. Projects that the user has previously worked on and saved will then be displayed. Alternatively, the user can search the predefined projects for a project that may be of interest by entering appropriate key words within a Search Projects text box 208. If the user selects one of the predefined projects such as "Plan a family reunion" to be opened, the selected project is opened within the integral project environment, as discussed below.

Figure 6:
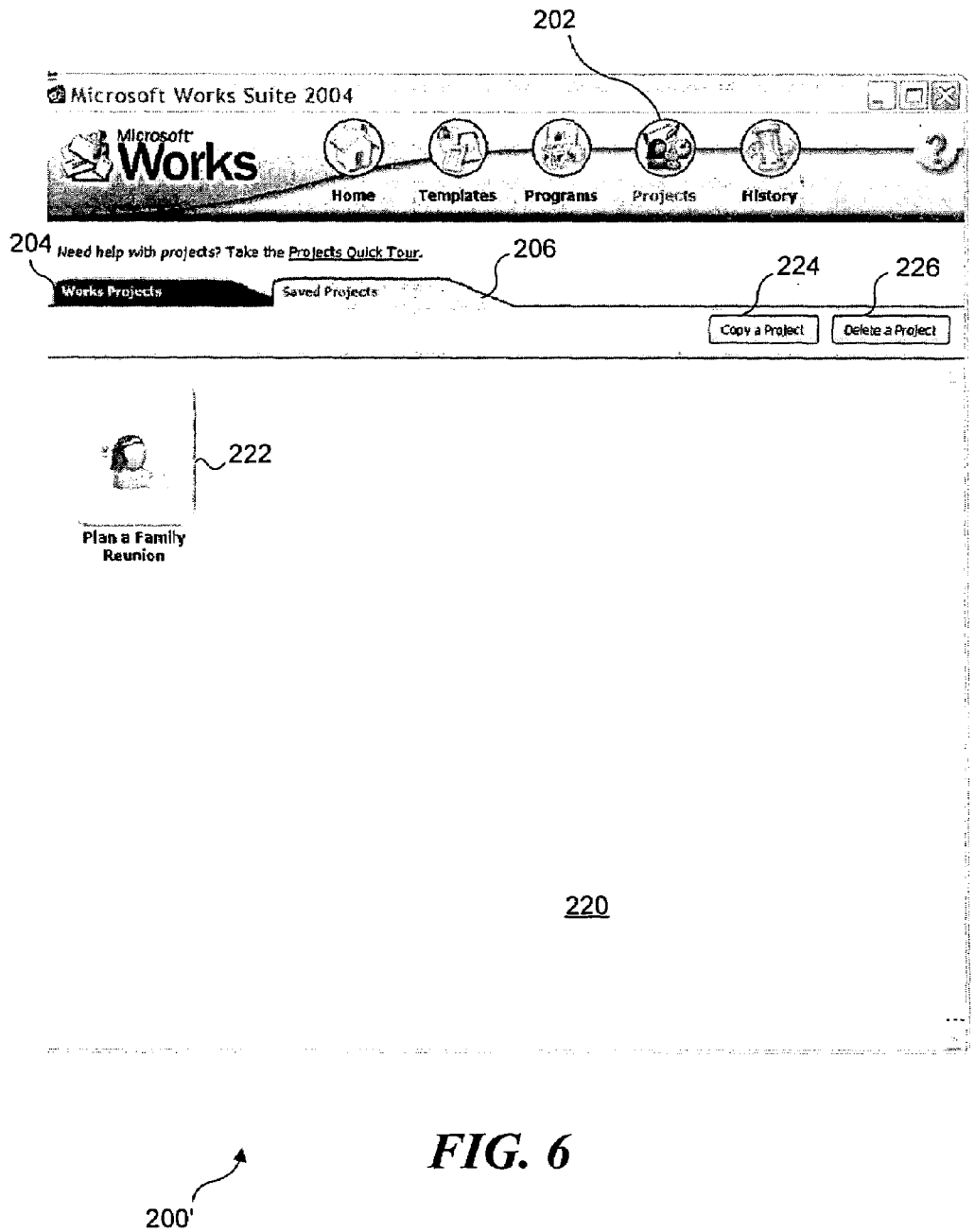
FIG. 6 is an exemplary view of the integral environment of FIG. 5, illustrating a saved project icon.

Once any significant change is made within the project for planning a family reunion and it is closed, it will automatically be saved and included in a window 220 within the Saved Projects displayed by selecting tab 206, as shown in FIG. 6. As illustrated in a user interface 200' in that Figure, an icon 222 is included for the project that has been saved that relates to planning a family reunion. In addition, the user can selectively copy an existing project so that a similar project can make use of the content of the project that is copied. To do so, the user selects a control 224. As a further option, the user can select a control 226 to delete a selected project that has previously been saved.

Figure 7:
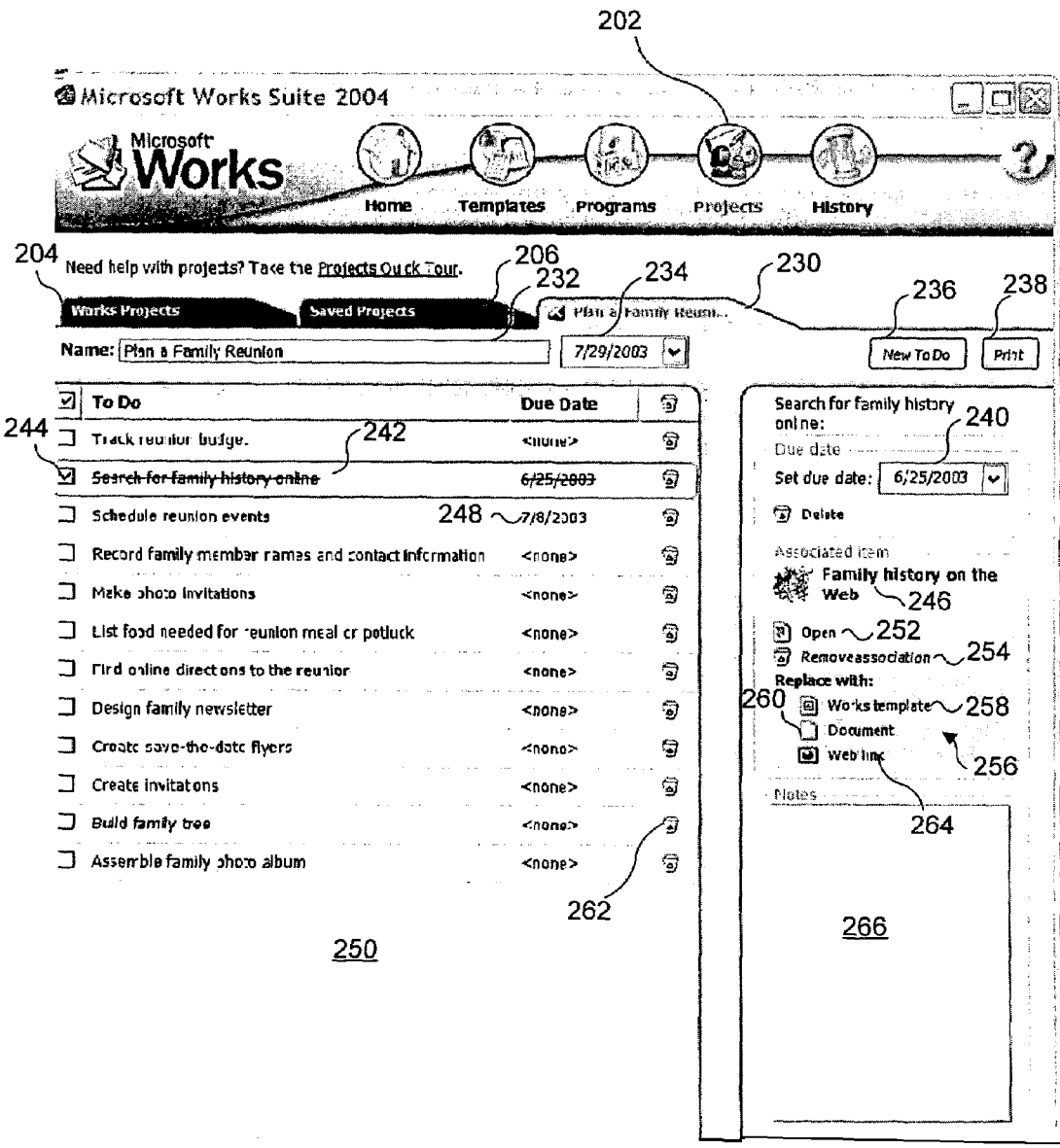
FIG. 7 is an exemplary view of the integral environment for the saved project of FIG. 6.

FIG. 7 illustrates a user interface 200" that is displayed if the user selects icon 222 in FIG. 6; i.e., double clicks on the icon. In the example shown in FIG. 7, the project that is opened is shown in a window 232, which identifies the project as "Plan a family reunion." A date 234 can selectively be entered by a user as being relevant to the project, e.g., to indicate the date on which the family reunion will be held. Also, a tab 230 indicates this project has been opened by the user as an active project on which the user wants to work, and the components of the project are readily accessible within the integral project environment that is thus displayed. A tab is provided for each project that has thus been opened within the project module, but the user can only work within the one current active project at a time. A window 250 in user interface 200" lists the to do items that are currently included within the project that is active. Since the current active project was a predefined project, each of the to do items listed were already included in the list of such items when the project was initially opened by the user. However, the user has made several changes to the predefined project, as discussed below.

For example, a to do item 242, which provides for searching a family history online, now has a due date associated with it. This due date was associated with the to do item when the user selected the due date in a dropdown box 240. This dropdown box displays a calendar view from which the user selected the due date. Furthermore, it is apparent that to do item 242 has already been completed, as indicated by a checkmark 244 that has been entered for this to do item. Also, since to do item 242 is currently selected and highlighted, an entity that is associated with the to do item is indicated to the right of the list. In this example, a family history on the Web option 246 has been associated with to do item 242, to facilitate searching for the family history online. By selecting entity 246, a Web browser will open at the Web link to enable looking up the family history.

A due date 248 is indicated for the next to do item in the list, indicating that the user has entered the due date in connection with that item using dropdown box 240. This due date for the to do item was then automatically scheduled within the calendar module of the WORKS™ productivity suite. At a specified date before or when the due that has been entered arrives, the calendar module will provide a reminder to the user to carry out the to do item with which the due date has been associated.

The user can selectively add a to do item to the list by actuating a control 236, which opens a descriptive text entry dialog for the new to do item at the bottom of the list. The user can then enter an appropriate title or descriptive phrase for the new to do item for display in the list. The current to do items in the list can be printed by activating a control 238. Any of the to do items in the list can be deleted simply by clicking on a trash can icon 262, which is included adjacent to each to do item in the list. In addition, any due date that has been set by the user in dropdown box 240 and associated with a to do item can also be selectively deleted by clicking on the trash can icon next to the dropdown box.

To open an entity that has been associated with a selected to do item in the list, the user can select an open option 252. Alternatively, if an association is provided for the item, selecting "remove association" 254 will eliminate the entity associated with the item.

For any item that does not include an association, the user can select from categories 256, which include WORKS template 258, document 260, and Web link 264. If the user selects document 260, a browser window will open enabling the user to identify an existing document that should be associated with the currently selected to do item. Similarly, as discussed below in connection with FIG. 9, selecting Web link category 264 enables the user to enter a URL or address for a specific Web page or site that will then be linked to the currently selected to do item.

A user can also associate a note or comments with the currently selected to do item by clicking within notes region 266, and entering the text that the user wishes to associate with the item within the region.

Figure 8:
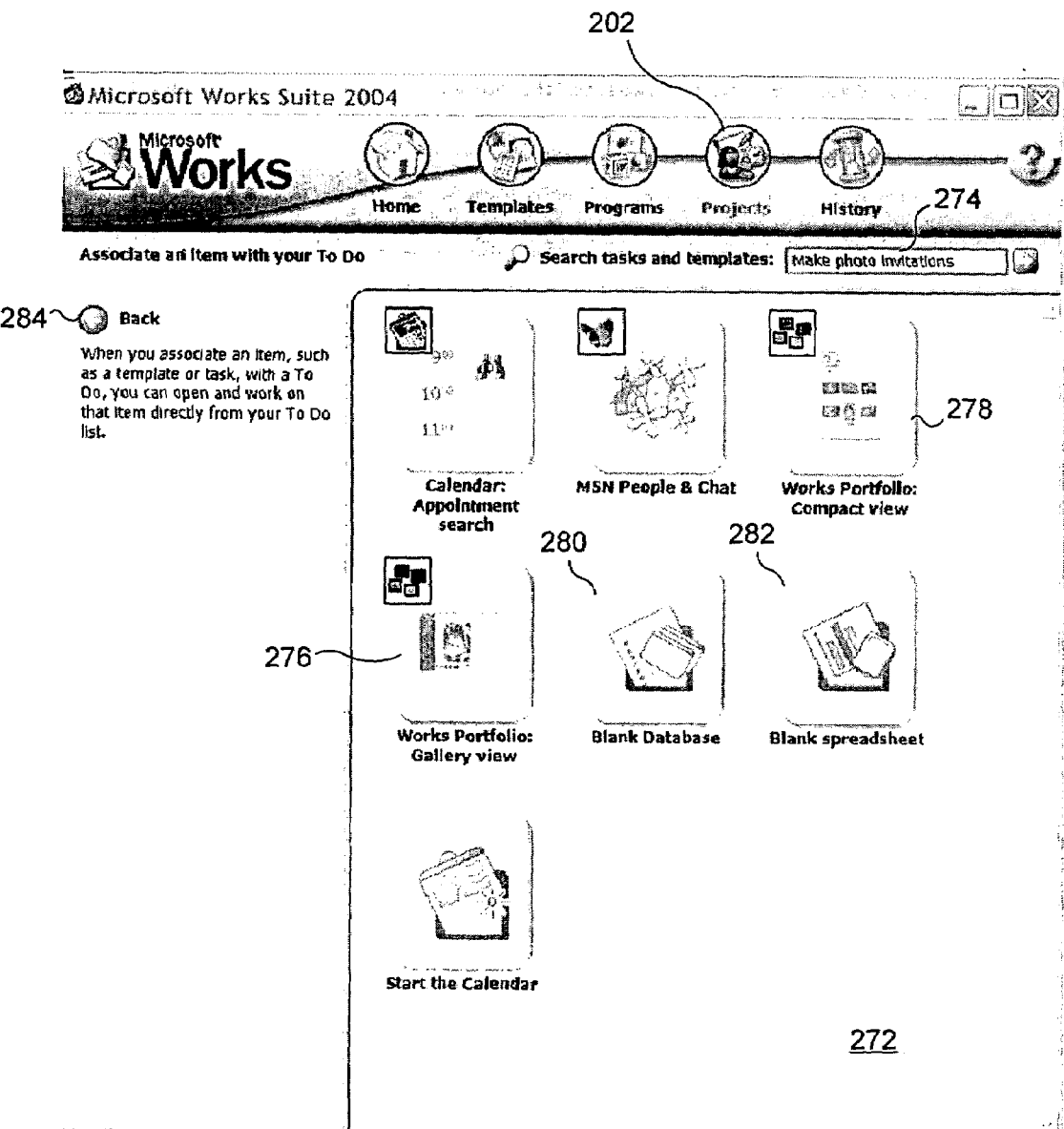
FIG. 8 is an exemplary view of several proposed templates that are displayed in connection with a selected to do item, in response to a user selecting a template option in FIG. 7.

If the user selects Works template 258, a natural language search is done by the program using Answer Wizard technology, as explained above, typically returning a plurality of potential tasks or templates that may be relevant to the to do item that is currently selected. FIG. 8 illustrates results 270 produced by such a search in connection with a to do item for making "photo invitations," as indicated in a text box 274. The templates or tasks that may be relevant to this to do item are included in a window 272. For example, when making photo invitations, the user may want to include a photo from the Microsoft WORKS Portfolio. Thus, options for Works Portfolio: Gallery view 276 and Works Portfolio: Compact view 278 are included in the results. Also included is a blank database 280 and a blank spreadsheet 282. For example, the user may want to create either a database or a spreadsheet for listing the names and addresses of the recipients of the invitation. If the user selects any of the options displayed within window 272, the view will automatically switch back to the display shown in FIG. 7, but the selected option will now be shown as associated with the currently selected to do item. Alternatively, the user may select an option 284, which returns to the previous user interface 200" without associating one of the options returned by the search with the currently selected to do item, or if no options were identified by the search.

Figure 9:
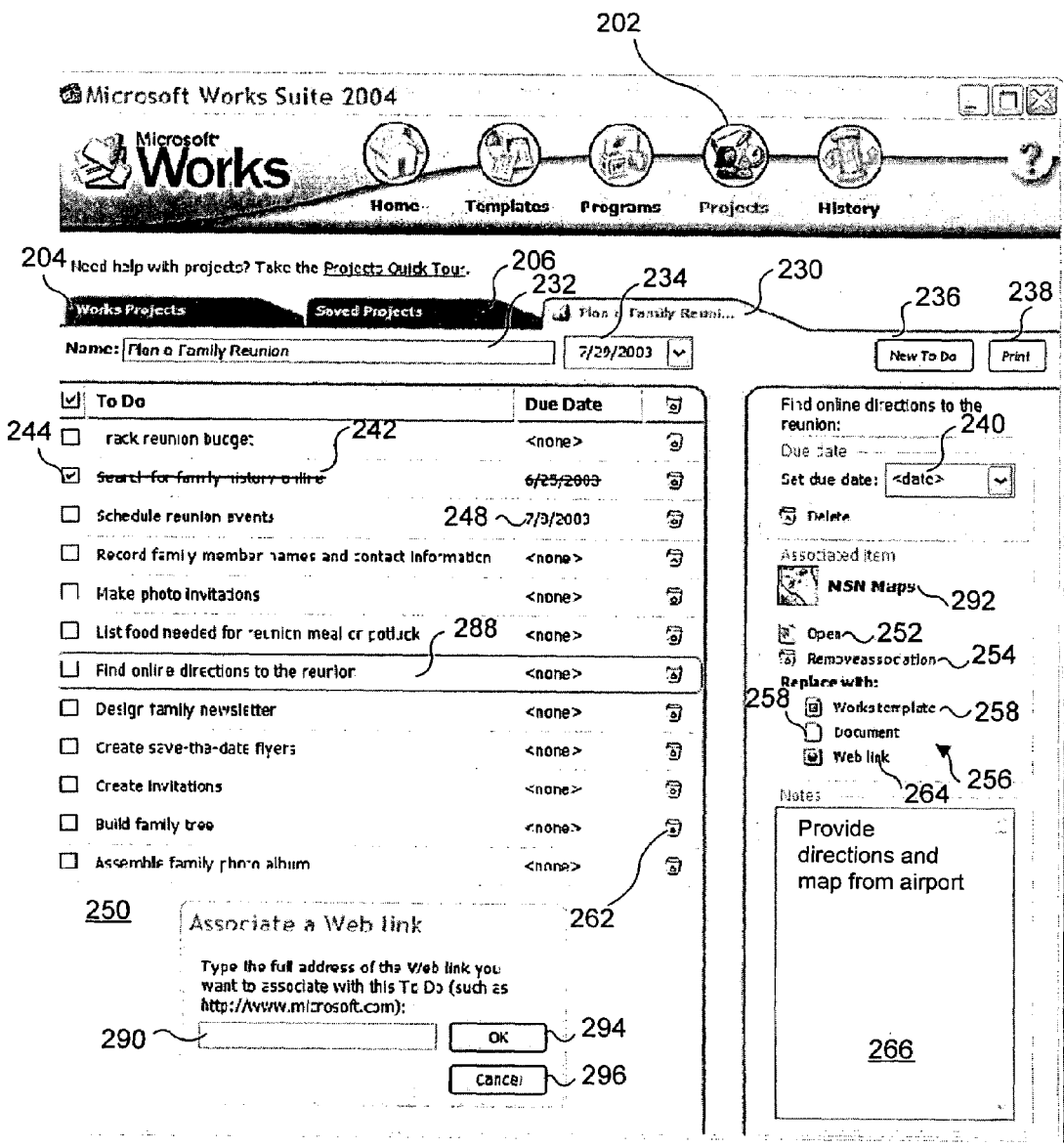
FIG. 9 is an exemplary view similar to FIG. 7, wherein a Web link dialog box is opened for input of a Web address, in response to a user selecting the Web link option.

In FIG. 9, user interface 200" illustrates several other aspects of the present invention. For example, the currently selected to do item 288 provides for finding online directions to the reunion. In this case, the user has selected Web link 264, which causes a Web address entry box 290 to be displayed in which the user can insert the URL or address for a map Web site to be linked to the currently selected to do item. Previously a Web site for MSN Maps & Directions 292 was associated with item 288, but instead, the user now wants to select a different URL or address for a different map Web site to be associated with the to do item. Once the user has entered the address for the new Web link, an OK button 294 can be selected, or alternatively, the user may select a cancel button 296, which will leave the current association of the to do item with MSN Maps 292 intact. FIG. 9 also illustrates an exemplary note in region 266 that is associated with to do item 288. This note reads "provide directions and map from airport."

Once the user has finished working on any of the items that require changes or associated entities with the to do list items as desired, the user can select the X on tab 230 to close out of the current project, causing the program to automatically save the project in its current state. Thus, it is not necessary for the user to manually select an option to save the project.

It should be evident that the present invention provides an efficient and easy interface that is integrated in regard to enabling the user to access all of the components necessary for creating, managing, and organizing to do items and other components of a project. Much of the efficiency of the present invention derives from enabling the user to associate entities such as a task or template, a Web link, or a document with any to do item of a project. This invention thus provides considerable power in a relatively simple and intuitive user interface.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A memory medium on which are stored machine instructions for carrying out a method for enabling a user to organize a project, comprising:
 (a) displaying an integral user environment to a user to enable access of information pertinent to the project from within the integral user environment;
 (b) receiving a list of to do items that are displayed within the integral user environment, wherein the to do items are reminders created by the user to take certain actions;
 (c) in response to user input, associating an entity with a single to do item selected from the list of to do items; wherein associating comprises:
  (i) simultaneously displaying the list of to do items and a user interface pane separate from the list of to do items in a non-overlapping manner, wherein a plurality of categories of entities from which the user can select within the integral user environment are displayed within the user interface pane, and wherein the plurality of categories of entities includes at least a Web link category and a document category;
  (ii) when the user selects the Web link category, displaying a uniform resource locator entry user interface that enables the user to indicate an address for a Web Page for association with the single to do item selected from the list;
  (iii) when the user indicates the address for the Web page, providing a first indication that the address for the Web Page is associated with the single to do item selected from the list;
  (iv) when the user selects the document category, displaying alternative choices of documents from which the user can select for association with the single to do item selected from the list; and
  (v) when the user selects a document from the alternative choices of documents for association, providing a second indication that the document is associated with the single to do item;
 (d) enabling a user to access said entity that is associated with the selected to do item, from the simultaneously displayed user interface pane where the associated entity to a selected to do item is displayed; and
 (e) for the single to do item associated with the entity, enabling the user to replace the entity associated with the single to do item with a new associated entity, wherein enabling the user to replace the entity comprises:
  (i) displaying, within the integral user environment, the plurality of categories of entities from which the user can select;
  (ii) when the user selects the Web link category, displaying the uniform resource locator entry user interface that enables the user to indicate another address for another Web page for association with the single to do item selected from the list;
  (iii) when the user indicates the another address for the another Web page, providing a third indication, replacing the first indication, that the another address for the another Web page is associated with the single to do item selected from the list; and
  (iv) when the user selects the document category, displaying alternative choices of documents from which the user can select for association with the single to do item selected from the list; and (v) when the user selects another document from the alternative choices of documents for association, providing a fourth indication, replacing the second indication, that the another document is associated with the single to do item.

2. The medium of claim 1, further comprising automatically executing a search for relevant alternative choices of entities to display to the user, as a function of the to do item in the list that is currently selected.

3. The medium of claim 2, further comprising providing alternative choices derived from other programs that are accessible to the user.

4. The medium of claim 2, further comprising the step of including a blank entity among the plurality of choices that are displayed to the user.

5. The medium of claim 1, further comprising enabling the user to enter a note in association with a currently selected to do item in the list, so that the note is displayed within the integral user environment when the user subsequently again selects said to do item in the list with which the note is associated.

6. The medium of claim 1, further comprising enabling the user to indicate a date for association with a currently selected to do item in the list.

7. The medium of claim 6, further comprising automatically scheduling the date indicated by the user within a calendar program so that a user is subsequently provided a reminder by the calendar program in regard to the date thus indicated.

8. The medium of claim 1, further comprising the step of providing a plurality of defined projects, each defined project including a plurality of proposed to do items that are likely relevant to a subject matter of the defined project.

9. A method for enabling a user to organize a project, comprising:
   (a) displaying an integral user environment to a user to enable access of information pertinent to the project from within the integral user environment;
   (b) receiving a list of to do items that are displayed within the integral user environment, wherein the to do items are reminders created by the user to take certain actions;
   (c) in response to user input, associating an entity with a single to do item selected from the list of to do items; wherein associating comprises:
      (i) simultaneously displaying the list of to do items and a user interface pane separate from the list of to do items in a non-overlapping manner, wherein a plurality of categories of entities from which the user can select within the integral user environment are displayed within the user interface pane, and wherein the plurality of categories of entities includes at least a Web link category and a document category;
      (ii) when the user selects the Web link category, displaying a uniform resource locator entry user interface that enables the user to indicate an address for a Web page for association with the single to do item selected from the list;
      (iii) when the user indicates the address for the Web page, providing a first indication that the address for the Web page is associated with the single to do item selected from the list;
      (iv) when the user selects the document category, displaying alternative choices of documents from which the user can select for association with the single to do item selected from the list; and
      (v) when the user selects a document from the alternative choices of documents for association, providing a second indication that the document is associated with the single to do item;
   (d) enabling a user to access said entity that is associated with the selected to do item, from the simultaneously displayed user interface pane where the associated entity to a selected to do item is displayed; and
   (e) for the single to do item associated with the entity, enabling the user to replace the entity associated with the single to do item with a new associated entity, wherein enabling the user to replace the entity comprises:
      (i) displaying, within the integral user environment, the plurality of categories of entities from which the user can select;
      (ii) when the user selects the Web link category, displaying the uniform resource locator entry user interface that enables the user to indicate another address for another Web page for association with the single to do item selected from the list;
      (iii) when the user indicates the another address for the another Web page, providing a third indication, replacing the first indication, that the another address for the another Web page is associated with the single to do item selected from the list; and
      (iv) when the user selects the document category, displaying alternative choices of documents from which the user can select for association with the single to do item selected from the list; and
      (v) when the user selects another document from the alternative choices of documents for association, providing a fourth indication, replacing the second indication, that the another document is associated with the single to do item.

10. The method of claim 9, further comprising automatically executing a search for relevant alternative choices of entities to display to the user, as a function of the to do item in the list that is currently selected.

11. The method of claim 10, further comprising providing alternative choices derived from other programs that are accessible to the user.

12. The method of claim 10, further comprising the step of including a blank entity among the plurality of choices that are displayed to the user.

13. The method of claim 9, further comprising enabling the user to enter a note in association with a currently selected to do item in the list, so that the note is displayed within the integral user environment when the user subsequently again selects said to do item in the list with which the note is associated.

14. The method of claim 9, further comprising enabling the user to indicate a date for association with a currently selected to do item in the list.

15. The method of claim 14, further comprising automatically scheduling the date indicated by the user within a calendar program so that a user is subsequently provided a reminder by the calendar program in regard to the date thus indicated.

16. The method of claim 9, further comprising the step of providing a plurality of defined projects, each defined project including a plurality of proposed to do items that are likely relevant to a subject matter of the defined project.

17. A system for enabling organizing a project, comprising:
   (a) a memory in which a plurality of machine instructions are stored;
   (b) a display on which text and graphics are displayed;

(c) a user input device that enables input and selection of choices provided on the display; and (d) a processor, coupled to the memory, user input device, and the display, said processor executing the plurality of machine instructions to carry out a plurality of functions, including:

(i) displaying an integral user environment to a user to enable access of information pertinent to the project from within the integral user environment;

(ii) receiving a list of to do items that are displayed within the integral user environment, wherein the to do items are reminders created by the user to take certain actions;

(iii) in response to user input, associating an entity with a single to do item selected from the list of to do items; wherein associating comprises:

(A) simultaneously displaying the list of to do items and a user interface pane separate from the list of to do items in a non-overlapping manner, wherein a plurality of categories of entities from which the user can select within the integral user environment are displayed within the user interface pane, and wherein the plurality of categories of entities includes at least a Web link category and a document category;

(B) when the user selects the Web link category, displaying a uniform resource locator entry user interface that enables the user to indicate an address for a Web page for association with the single to do item selected from the list;

(C) when the user indicates the address for the Web page, providing a first indication that the address for the Web page is associated with the single to do item selected from the list;

(D) when the user selects the document category, displaying alternative choices of documents from which the user can select for association with the single to do item selected from the list; and (E) when the user selects a document from the alternative choices of documents for association, providing a second indication that the document is associated with the single to do item;

(iv) enabling a user to access said entity that is associated with the selected to do item, from the simultaneously displayed user interface pane where the associated entity to a selected to do item is displayed; and (v) for the single to do item associated with the entity, enabling the user to replace the entity associated with the single to do item with a new associated entity, wherein enabling the user to replace the entity comprises:

(A) displaying, within the integral user environment, the plurality of categories of entities from which the user can select;

(B) when the user selects the Web link category, displaying the uniform resource locator entry user interface that enables the user to indicate another address for another Web page for association with the single to do item selected from the list;

(C) when the user indicates the another address for the another Web page, providing a third indication, replacing the first indication, that the another address for the another Web page is associated with the single to do item selected from the list; and (D) when the user selects the document category, displaying alternative choices of documents from which the user can select for association with the single to do item selected from the list; and (E) when the user selects another document from the alternative choices of documents for association, providing a fourth indication, replacing the second indication, that the another document is associated with the single to do item.

18. The system of claim 17, wherein the machine instructions further cause the processor to automatically execute a search for relevant alternative choices of entities to display to the user, as a function of the to do item in the list that is currently selected.

19. The system of claim 18, wherein the machine instructions further cause the processor to provide alternative choices derived from other programs that are accessible to the user.

20. The system of claim 18, wherein the machine instructions further cause the processor to include a blank entity among the plurality of choices that are displayed to the user.

21. The system of claim 17, wherein the machine instructions further cause the processor to enable the user to enter a note in association with a currently selected to do item in the list, so that the note is displayed within the integral user environment when the user subsequently again selects said to do item in the list with which the note is associated.

22. The system of claim 17, wherein the machine instructions further cause the processor to enable the user to indicate a date for association with a currently selected to do item in the list.

23. The system of claim 22, wherein the machine instructions further cause the processor to automatically schedule the date indicated by the user within a calendar program so that a user is subsequently provided a reminder by the calendar program in regard to the date thus indicated.

24. The system of claim 17, wherein the machine instructions further cause the processor to provide a plurality of defined projects, each defined project including a plurality of proposed to do items that are likely relevant to a subject matter of the defined project.

* * * * *